United States Patent
Tsoy et al.

(10) Patent No.: US 12,086,149 B2
(45) Date of Patent: Sep. 10, 2024

(54) METHOD AND SYSTEM FOR DETERMINING RANK POSITIONS OF CONTENT ELEMENTS BY A RANKING SYSTEM

(71) Applicant: YANDEX EUROPE AG, Lucerne (CH)

(72) Inventors: Valeriya Dmitrievna Tsoy, Novosibirsk (RU); Budimir Aleksandrovich Baev, Saint-Petersburg (RU); Ilya Vladimirovich Katsev, Saint-Petersburg (RU)

(73) Assignee: Y.E. Hub Armenia LLC, Yerevan (AM)

( * ) Notice: Subject to any disclaimer, the term of this patent is extended or adjusted under 35 U.S.C. 154(b) by 0 days.

(21) Appl. No.: 17/520,762

(22) Filed: Nov. 8, 2021

(65) Prior Publication Data

US 2022/0327134 A1  Oct. 13, 2022

(30) Foreign Application Priority Data

Apr. 9, 2021  (RU) ............................... 2021109882

(51) Int. Cl.
*G06F 7/00* (2006.01)
*G06F 16/2457* (2019.01)
(Continued)

(52) U.S. Cl.
CPC ...... *G06F 16/24578* (2019.01); *G06F 16/248* (2019.01); *G06N 20/00* (2019.01)

(58) Field of Classification Search
CPC ........... G06F 16/3326; G06F 16/24578; G06F 16/93; G06F 16/685; G06F 16/248; G06F 16/951; G06F 3/167; G06N 20/00
See application file for complete search history.

(56) References Cited

U.S. PATENT DOCUMENTS 8,180,768 B2   5/2012  Ceri et al.
8,606,769 B1   12/2013 Berry
(Continued)

FOREIGN PATENT DOCUMENTS

CN   108829808 A    11/2018
CN   111104601 A    5/2020
(Continued)

OTHER PUBLICATIONS

English Abstract for CN108829808 retrieved on Espacenet on Jul. 22, 2021.

(Continued)

*Primary Examiner* — Mohammad A Sana

(74) *Attorney, Agent, or Firm* — BCF LLP

(57) ABSTRACT

A method and system for determining rank positions of a set of content elements by a ranking system. During a training phase of the ranking system, a plurality of datasets of previous user interactions with interfaces are acquired. For each dataset, a last-viewed content element in the interface is determined. A win score is determined for content elements that the user interacted with. A loss score is determined for content elements ranked lower than the last-viewed content element. During an in-use phase of the ranking system, a set of content elements is received. Predicted relevance scores are determined for each content element of the set of content elements. Rank positions of each content element of the set of content elements are determined based on the predicted relevance scores.

20 Claims, 6 Drawing Sheets

(51) Int. Cl.
  *G06F 16/248* (2019.01)
  *G06N 20/00* (2019.01)

(56) References Cited

U.S. PATENT DOCUMENTS

| | | | |
|---|---|---|---|
| 9,092,489 | B1 | 7/2015 | Dasilva et al. |
| 9,183,299 | B2 | 11/2015 | Leigh et al. |
| 10,515,625 | B1* | 12/2019 | Metallinou ........... G10L 15/197 |
| 10,545,624 | B2 | 1/2020 | Meyerzon et al. |
| 10,824,627 | B2 | 11/2020 | Rybalchenko et al. |
| 2009/0019035 | A1 | 1/2009 | House et al. |
| 2012/0130974 | A1 | 5/2012 | Leigh et al. |
| 2012/0323967 | A1* | 12/2012 | Ju ........................ G06F 16/93 |
| | | | 707/E17.014 |
| 2013/0127920 | A1 | 5/2013 | Grinshpon et al. |
| 2013/0268505 | A1 | 10/2013 | Urbanski |
| 2014/0122456 | A1 | 5/2014 | Dies |
| 2014/0122475 | A1* | 5/2014 | Li ..................... G06F 16/3326 |
| | | | 707/734 |
| 2014/0122590 | A1 | 5/2014 | Svendsen |
| 2014/0143605 | A1 | 5/2014 | Balla et al. |
| 2014/0280219 | A1 | 9/2014 | Maser et al. |
| 2014/0368511 | A1 | 12/2014 | Baumgartner et al. |
| 2014/0379683 | A1 | 12/2014 | Bazaz |
| 2015/0120712 | A1 | 4/2015 | Yi et al. |
| 2015/0127637 | A1 | 5/2015 | Cavanagh et al. |
| 2015/0142567 | A1 | 5/2015 | Neelakant |
| 2017/0075897 | A1 | 3/2017 | Nikulin |
| 2017/0140053 | A1 | 5/2017 | Vorobev |
| 2017/0185602 | A1 | 6/2017 | Gusev et al. |
| 2018/0075137 | A1 | 3/2018 | Lifar et al. |
| 2018/0096379 | A1 | 4/2018 | Rama et al. |
| 2018/0203921 | A1 | 7/2018 | Privault et al. |
| 2019/0034432 | A1 | 1/2019 | Rybalchenko et al. |
| 2019/0163758 | A1 | 5/2019 | Zhivotvorev et al. |
| 2020/0110754 | A1 | 4/2020 | Lamburt et al. |
| 2021/0303648 | A1 | 9/2021 | Kubota et al. |
| 2021/0312560 | A1 | 10/2021 | Hayward |
| 2023/0252281 | A1 | 8/2023 | Shamir et al. |

FOREIGN PATENT DOCUMENTS

| | | |
|---|---|---|
| EP | 3293646 A1 | 3/2018 |
| RU | 2666336 C1 | 9/2018 |
| RU | 2689812 C2 | 5/2019 |
| RU | 2692045 C1 | 6/2019 |
| WO | 2015188885 A1 | 12/2015 |

OTHER PUBLICATIONS

English Abstract for CN111104601 retrieved on Espacenet on Jul. 22, 2021.

Office Action dated Jun. 14, 2023 in respect of the related U.S. Appl. No. 17/383,121.

Office Action issued on Nov. 28, 2023 in respect of the related U.S. Appl. No. 17/383,121.

Russian Search Report dated Jun. 23, 2022 issued in respect of the counterpart Russian Patent Application No. RU 2021109882.

Russian Search Report dated May 30, 2022 issued in respect of the counterpart Russian Patent Application No. RU 2020139194.

Notice of Allowance dated Mar. 27, 2024 issued in respect of the related U.S. Appl. No. 17/383,121.

* cited by examiner

| Content Element | Interaction | Win Score | Loss Score | Label |
|---|---|---|---|---|
| 301 | Article selected first and viewed for 90 seconds | 1 | 0 | 1 |
| 302 | Video selected second and played to the end | 0.8 | 0 | 0.8 |
| 303 | Selected third and then interface was closed | 0.7 | 0 | 0.7 |
| 304 | Not selected | 0 | 0.8 | -0.8 |
| 305 | Not selected | 0 | 0.4 | -0.4 |

METHOD AND SYSTEM FOR DETERMINING RANK POSITIONS OF CONTENT ELEMENTS BY A RANKING SYSTEM

FIELD OF TECHNOLOGY

The present technology relates to ranking content elements and, more specifically, to methods and systems for determining rank positions of content elements by a ranking system.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (such as a desktop, laptop, notebook, smartphone, tablets and the like) to access content on these networks (such as text, images, audio, video, animation, and other digital content).

A user can access resources on the communication network by various means. The user can access a particular resource directly, either by typing an address of the resource, such as a uniform resource locator (URL), or by clicking a link, such as a link received in an e-mail or selected while browsing another web resource. The user may conduct a search using a search engine to locate a resource of interest.

A user may access an application, web page, or other interface that presents various types of content to the user. The operator of the interface may wish to recommend content to the user that the user would find interesting. By providing content that is interesting to the user, the user may be more likely to continue accessing the interface.

It may be difficult to determine whether certain content would be of interest to the user. It may be difficult to determine whether recommended content was of interest to the user. For the foregoing reasons, there is a need for new methods and systems for ranking content elements.

US 2015/0120712A1 filed by Verizon Media Inc., on Oct. 25, 2013, discloses methods, systems, and computer programs are presented for selecting news articles for presentation to a user. One method includes an operation for measuring dwelltimes for a first set of news items, where the dwelltime for a news item is based on the amount of time that the news item is displayed to a viewer. Further, the method includes an operation for training a classifier of news items based on the measured dwelltimes and based on features associated with the first set of news items. Additionally, the method includes an operation for ranking with the classifier a second set of news items for presentation to the user, the ranking also using the profile of the user for delivery of customized news to the user. The ranked second set of news item is then presented to the user.

SUMMARY

Developers of the present technology have appreciated that identifying relevant content elements may be improved by analyzing prior user interactions with content elements. An interface (which may also be referred to as a "feed") containing content elements may be generated for a user. The interface may be an interface of a mobile application, a browser application, or the like. The content elements may be displayed in the interface as a scrollable list. Content elements that are more likely to be relevant to the user may be positioned at the top of the list.

The user's interactions with the content elements may be used to determine a win score and/or loss score for each content element. A win score and/or loss score may be determined for each content element displayed to the user, or a subset of the content elements displayed to the user. The win score or loss score for a content element may be determined based on whether the user interacted with the content element and/or whether the user interacted with other content elements. For example if a content element is an article and the user reads the article, the content element may be assigned a win score.

If a user does not find the content elements in the interface relevant, the user may close or refresh the interface. This action of closing or refreshing the interface may be an indication that the user did not find the remaining content elements that the user did not interact with to be relevant. Win scores may be assigned to content elements that the user interacted with. Loss scores may be assigned to content elements based on the action of closing or refreshing the feed.

A machine learning algorithm (MLA) may be trained to predict a relevance score for a content element. Records of previous user interactions with interfaces displaying content elements may be used as training data for the MLA. A training dataset may be generated, where each content element in the training dataset is assigned a label. The label assigned to a content element may be determined based on the loss score and/or the win score. The MLA may then be used to predict relevance scores for content elements. The MLA may receive attributes of a content element as input, such as a type of the content element, a source of the content element, a ranking of the content element, an age of the content element, a length of the content element, a number of times the content element has been viewed, a user rating corresponding to the content element, and/or any other attributes of the content element. The MLA may output a predicted relevance score for the content element. The predicted relevance scores may be used to determine whether a content element will be displayed to a user and/or a ranking of the content element. A set of content elements may be ranked based on the relevance scores predicted by the MLA and displayed in the ranked order.

Embodiments of the present technology have been developed based on developers' appreciation of at least one technical problem associated with the prior art solutions. Therefore, developers have devised methods and systems for determining rank positions of content elements by a ranking system. Moreover, developers have devised methods and systems that allow training a ranking system to predict scores of content elements, ranking the content elements based on their scores, and outputting an interface containing the content elements in their ranked order.

In a first broad aspect of the present technology, there is provided a method of determining rank positions, by a ranking system, of a set of content elements, the method executable by a server, the method comprising: during a training phase of the ranking system, acquiring a plurality of datasets, each dataset comprising an indication of previous user interactions associated with an interface displaying a ranked list of content elements, and for each dataset of the plurality of datasets: determining a last-viewed content element in the respective ranked list of content elements, wherein the last-viewed content element was a last content element interacted with by a user prior to the respective interface being abandoned; determining, by the server, a win score for at least one content element of the respective ranked list of content elements that the user selected; determining a loss score for at least one content element ranked lower than the last-viewed content element; and training, by the server, the ranking system to predict a relevance score for content elements based on win scores and loss scores for the content elements of the ranked list of content elements; and during an in-use phase of the ranking system, the ranking system having been trained to rank content elements based on previous user interactions: receiving, by the server, the set of content elements; predicting, by the ranking system, a predicted relevance score for each content element of the set of content elements; and determining, based on the predicted relevance score of each respective content element, the rank positions of each content element of the set of content elements.

In some implementations of the method, determining the loss score for the at least one content element ranked lower than the last-viewed content element comprises: determining, for a content element ranked lower than the last-viewed content element, a number of content elements displayed between the content element and the last-viewed content element; and determining, based on the number of content elements, the loss score for the content element.

In some implementations of the method, determining the loss score for the at least one content element ranked lower than the last-viewed content element comprises: determining, for a first content element ranked lower than the last-viewed content element, a first number of content elements displayed between the first content element and the last-viewed content element; determining, for a second content element ranked lower than the last-viewed content element, a second number of content elements displayed between the second content element and the last-viewed content element; determining, based on the first number of content elements, a first loss score for the first content element; and determining, based on the second number of content elements, a second loss score for the second content element, wherein the second loss score is greater than the first loss score, and wherein the second number of content elements is lower than the first number of content elements.

In some implementations of the method, the method further comprises displaying a vertically arranged set of tiles, each tile comprising a content element of the set of content elements.

In some implementations of the method, the vertically arranged set of tiles are displayed in the order of the rank positions.

In some implementations of the method, for each dataset, each content element in the respective ranked list of content elements was displayed to the respective user.

In some implementations of the method, the method further comprises for each dataset, removing any content elements in the respective ranked list of content elements that were not displayed to the respective user.

In some implementations of the method, determining the rank positions of each content element comprises ranking the set of content elements in order from highest-scoring content element to lowest-scoring content element.

In another broad aspect of the present technology, there is provided a method of determining loss scores for content elements displayed on an interface, the method comprising: displaying, to a user, the interface, wherein the interface includes a plurality of content elements; receiving an indication of user interactions with the interface, wherein the user interactions include a shutdown or refresh of the interface; determining, a last-viewed content element of the plurality of content elements, wherein the last-viewed content element was a last element interacted with by the user prior to the shutdown or the refresh of the interface; determining one or more content elements, of the plurality of content elements, that were displayed to the user below the last-viewed content element; and determining, for each of the one or more content elements, a loss score corresponding to the respective content element based at least in part on a position of the respective content element below the last-viewed content element.

In some implementations of the method, determining the loss score corresponding to the respective element comprises: determining a number of elements displayed between the last-viewed content element and the respective element; and determining, based on the number of elements, the loss score for the respective element.

In some implementations of the method, wherein the one or more content elements comprises a first content element and a second content element, and further comprising: determining, for the first content element, a first number of content elements displayed between the first content element and the last-viewed content element; and determining, for the second content element, a second number of content elements displayed between the second content element and the last-viewed content element; determining, based on the first number of content elements, a first loss score for the first content element; and determining, based on the second number of content elements, a second loss score for the second content element, wherein the second loss score is greater than the first loss score, and wherein the second number of content elements is lower than the first number of content elements.

In some implementations of the method, the interface comprises a ranked list of the plurality of content elements.

In some implementations of the method, the indication of user interactions comprises a record of user inputs received while displaying the interface.

In another broad aspect of the present technology, there is provided a system. The system comprises: at least one processor, and memory storing a plurality of executable instructions which, when executed by the at least one processor, cause the system to: during a training phase of a ranking system, acquire a plurality of datasets, each dataset comprising an indication of previous user interactions associated with an interface displaying a ranked list of content elements, and for each dataset of the plurality of datasets: determine a last-viewed content element in the respective ranked list of content elements, wherein the last-viewed content element was a last content element selected by a user prior to the respective interface being abandoned; determine, by the server, a win score for at least one content element of the respective ranked list of content elements that the user selected; determine a loss score for at least one content element ranked lower than the last-viewed content element; and train, by the server, the ranking system to predict a relevance score for content elements based on win scores and loss scores for the content elements of the ranked list of content elements; and during an in-use phase of the ranking system, the ranking system having been trained to rank content elements based on previous user interactions: receive, by the server, a set of content elements; predict, by the ranking system, a predicted relevance score for each content element of the set of content elements; and determine, based on the predicted relevance score of each respective content element, rank positions of each content element of the set of content elements.

In some implementations of the system, the instructions that cause the system to determine the loss score for the at least one content element comprise instructions that cause the system to: determine, for a content element ranked lower than the last-viewed content element, a number of content elements displayed between the content element and the last-viewed content element; and determine, based on the number of content elements, the loss score for the content element.

In some implementations of the system, the instructions that cause the system to determine the loss score for the at least one content element comprise instructions that cause the system to: determine, for a first content element ranked lower than the last-viewed content element, a first number of content elements displayed between the first content element and the last-viewed content element; determine, for a second content element ranked lower than the last-viewed content element, a second number of content elements displayed between the second content element and the last-viewed content element; determine, based on the first number of content elements, a first loss score for the first content element; and determine, based on the second number of content elements, a second loss score for the second content element, wherein the second loss score is greater than the first loss score, and wherein the second number of content elements is lower than the first number of content elements.

In some implementations of the system, the instructions cause the system to: display, in an order of the rank positions, a vertically arranged set of tiles, each tile comprising a content element of the set of content elements.

In some implementations of the system, for each dataset, each content element in the respective ranked list of content elements was displayed to the respective user.

In some implementations of the system, the instructions cause the system to, for each dataset, remove any content elements in the respective ranked list of content elements that were not displayed to the respective user.

In some implementations of the system, the instructions that cause the system to determine the rank positions of each content element comprise instructions that cause the system to rank the set of content elements in order from highest-scoring content element to lowest-scoring content element.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server."

In the context of the present specification, "electronic device" may be any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. Some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" may be any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology may each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
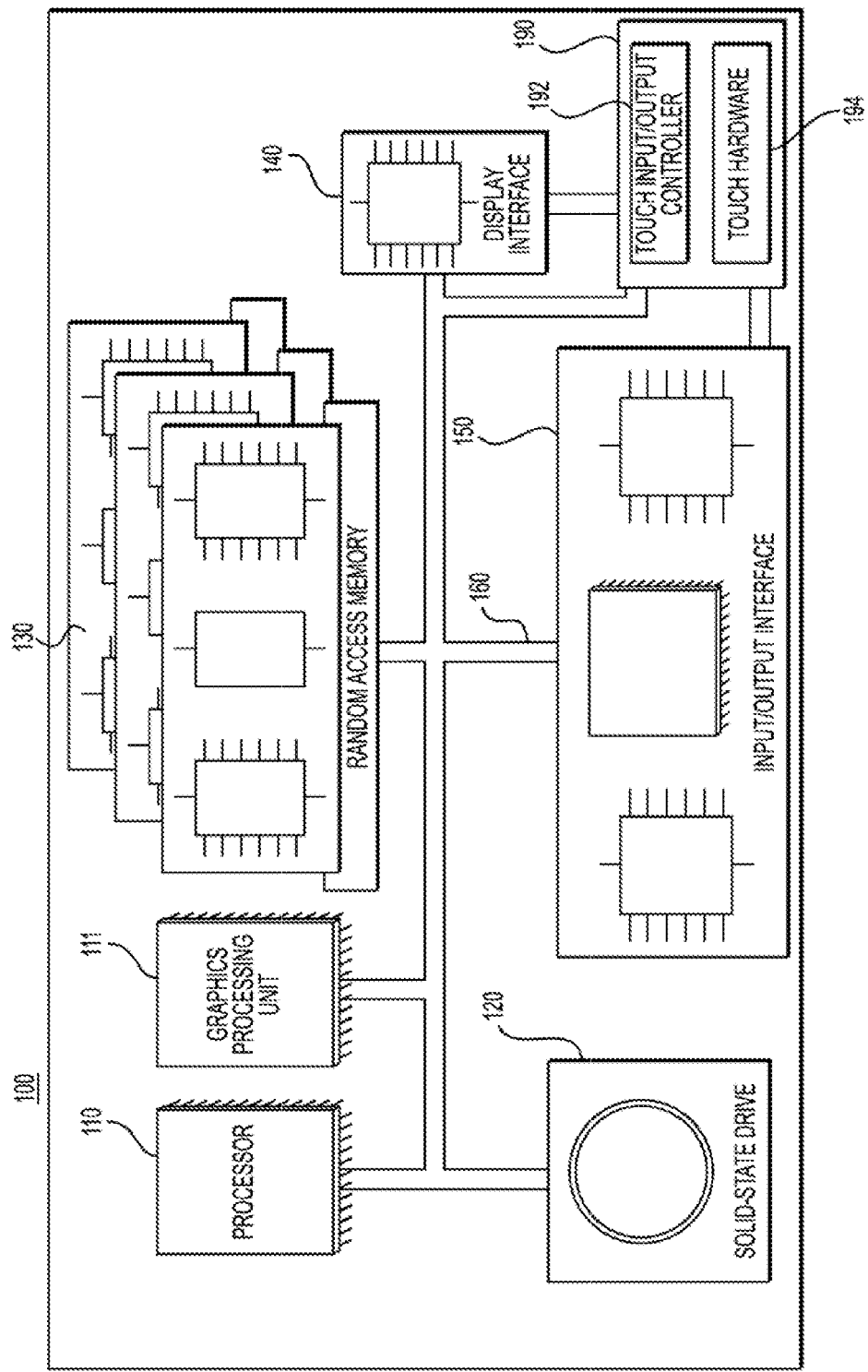
FIG. 1 depicts a schematic diagram of an example computer system for implementing non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown a computer system 100 suitable for use with some implementations of the present technology. In some embodiments, the computer system 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computer system 100 comprises various hardware components including one or more single or multi-core processors collectively represented by processor 110, a solid-state drive 120, a random access memory 130, and an input/output interface 150. The computer system 100 may be a computer specifically designed to operate a machine learning algorithm (MLA). The computer system 100 may be a generic computer system.

In some embodiments, the computer system 100 may also be a subsystem of one of the above-listed systems. In some other embodiments, the computer system 100 may be an "off-the-shelf" generic computer system. In some embodiments, the computer system 100 may also be distributed amongst multiple systems. The computer system 100 may also be specifically dedicated to the implementation of the present technology. As a person in the art of the present technology may appreciate, multiple variations as to how the computer system 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computer system 100 may be enabled by a system bus 160 comprising one or more internal and/or external buses (e.g., a Peripheral Component Interconnect (PCI) bus, universal serial bus, Institute of Electrical and Electronics Engineers (IEEE) 1394 "Firewire" bus, Small Computer System Interface (SCSI) bus, Serial Advanced Technology Attachment (Serial-ATA) bus, etc.), to which the various hardware components are electronically coupled.

The input/output interface 150 may provide networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the system bus 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the system bus 160. In some embodiments, the input/output interface 150 may be connected to a keyboard (not shown), a mouse (not shown) or a trackpad (not shown) allowing the user to interact with the computer system 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Figure 2:
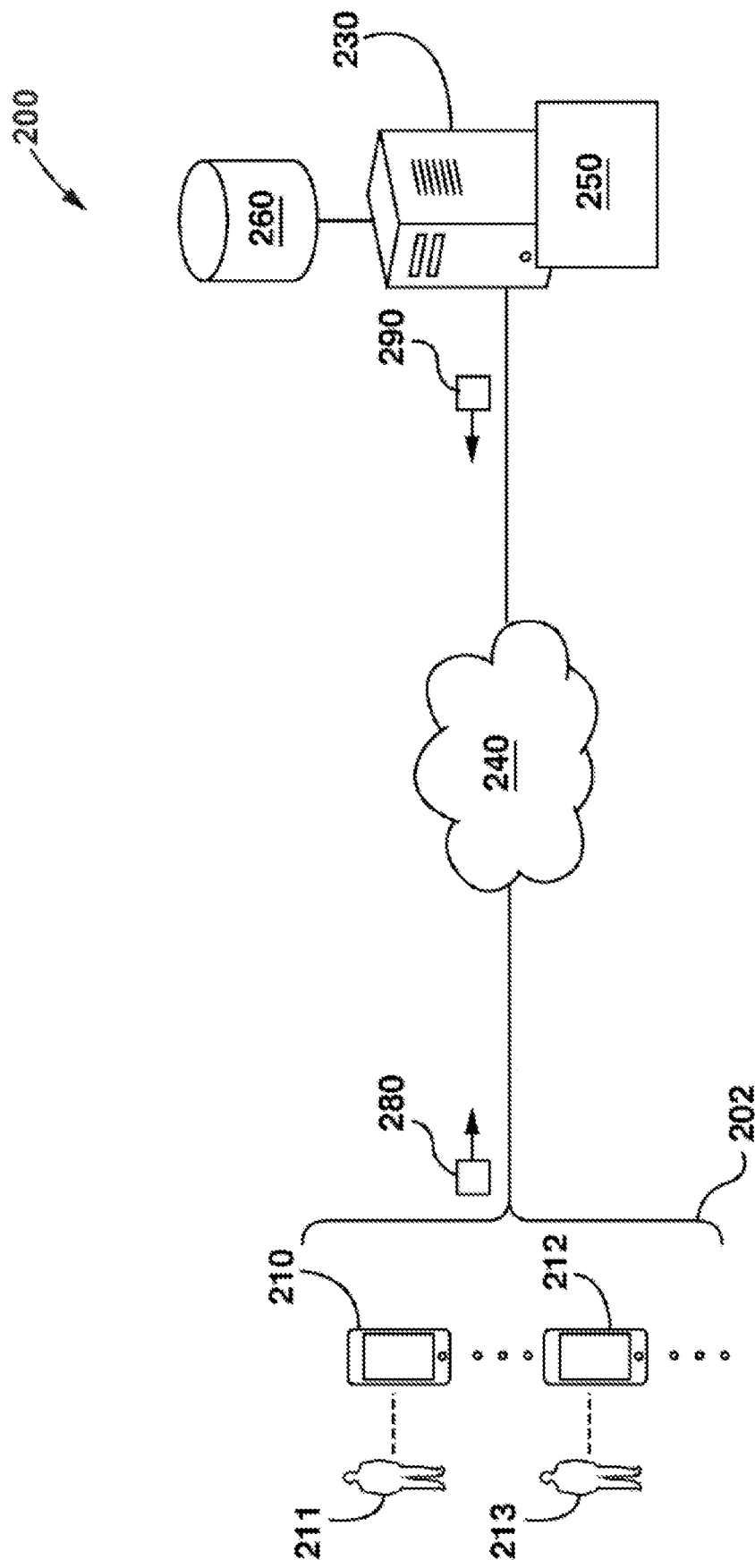
FIG. 2 depicts a networked computing environment according to some embodiments of the present technology.

FIG. 2 illustrates a networked computing environment 200 suitable for use with some embodiments of systems and/or methods of the present technology. The networked computing environment 200 comprises a plurality of electronic devices 202 and a server 230 which are communicatively coupled via a communication network 240. The plurality of electronic devices 202 comprises electronic devices 210 and 212 which are respectively associated with users 211 and 213. It should be noted that the plurality of electronic devices 202 may comprise a larger number of electronic devices such as 100, 1000, 10000, 1000000, and the like. It should be noted that the networked computing environment 200 may comprise other electronic devices such as, but not limited to, resource servers (not depicted) for providing web resources, without departing from the scope of the present technology. Some or all of the devices in the networked computing environment 200, including the electronic devices 202, may be computer systems 100. The electronic devices 202 may be wireless communication devices such as a mobile telephone (e.g. a smart phone or a radio-phone), a tablet, a personal computer and the like.

As previously mentioned, a user 211 or 213 is associated with a respective electronic device 210 or 212. The devices 210 and 212 may be associated with the users 211 and 213 through any means, such as by the users 211 and 213 being registered and/or logged in with a service, and/or based on an association between an identifier of the devices 210 and 212 (such as an IP address) and the users 211 and 213.

The electronic devices 210 and 212 may comprise some or all of the components of the computer system 100 depicted in FIG. 1. The electronic devices 210 and 212 may comprise hardware and/or software and/or firmware, or a combination thereof, for executing a web browser application and communicating with the server 230 via the communication network 240. The web browser application may provide access to one or more web resources via the communication network 240. One example of the web browser application is a YANDEX™ browser, but any web browser may be used, such as a mobile device web browser. The electronic devices 210 and 212 may execute any other type of application, such as a content discovery application. The content discovery application may present content elements to the users 211 and 213.

In some embodiments of the present technology, the communication network 240 is the Internet. In alternative non-limiting embodiments, the communication network 240 may include a local area network (LAN), wide area network (WAN), a private communication network, and/or the like. All or portions of the communication network 240 may be a wireless communication link. Examples of wireless communication links include, but are not limited to, a 3G, 4G, 5G communication network link and the like.

In some embodiments of the present technology, the server 230 may be a conventional computer server. For example the server 230 may be a Dell™ PowerEdge™ Server running the Microsoft™ Windows Server™ operating system. The functionality of the server 230 may be distributed to any number of servers 230 and may be implemented via multiple servers 230.

In some embodiments of the present technology, the server 230 may host one or more computer-executed services such as a content discovery and/or content recommendation system. In other words, the server 230 may be under control and/or management of a content provider (not depicted), such as, for example, an operator of the YANDEX ZEN™ personal content feed. The server 230 may be configured to generated and/or display content elements. The server 230 may be configured to generate and/or send, to any one of the plurality of electronic devices 202, a response data packet 290 via the communication network 240. How the server 230 is configured to generate and send the response data packet 290 as well as the content of the response data packet 290 will be further described below.

There is also depicted a database 260 that is communicatively coupled to the server 230. Even though in the depicted embodiment the database 260 is coupled directly to the server 230 (such as via a private network), in alternative implementations, the database 260 may be communicatively coupled to the server 230 via the communication network 240.

Although the database 260 is illustrated in FIG. 2 as a single entity, the database 260 may be implemented in a distributed manner, for example, the database 260 could have different components, each component being configured for a particular kind of retrieval therefrom or storage therein. The database 260 may be a structured collection of data, irrespective of its particular structure or the computer hardware on which data is stored, implemented or otherwise rendered available for use. The database 260 may reside on the same hardware as a process that stores or makes use of the information stored in the database 260 or it may reside on separate hardware. Generally speaking, the database 260 may receive data from the server 230 for storage thereof and may provide stored data to the server 230 for use thereof.

The database 260 may store information associated with web-resource elements that are available from a plurality of resources (i.e., the resource servers) and accessible via the communication network 240. The information may include content elements, which may be any type of media such as articles, blog posts, images, videos, sounds, web pages, social media content, and/or any other type of content. The database 260 may be populated and/or maintained via a "crawling" process and/or any other process for collecting content items. The process of crawling can be executed (and repeated) on a regular (and recurring) basis. Through the re-execution of the process of crawling, the database 260 is populated with an indication of new resources and/or content elements available via the communication network 240. For the sake of simplicity only, the various media available will be referred to herein simply as "content elements."

It is contemplated that content elements may be associated with, and classified in the database 260 by, their respective types. For example, a given content element may be an image-type content element, a video-type content element, an audio-type content element, a news-type content element, a resource-type content element and/or any other content element type. Operators of the server 230 may define the content element types. Content elements may be displayed in an interface, such as an interface displayed by a web page, content discovery application, widget on a mobile device, etc. For example, an audio content element may be output to an interface when the audio-type content element is predicted to be of interest to the user accessing the interface. The audio content element may allow the user to listen to audio corresponding to the audio-type content element without browsing away from the interface.

The database 260 may also store attributes associated with each element. Some element attributes may be retrieved from the respective resources (or sources) corresponding to these elements, while other element attributes may be determined by the server 230. For example, the database 260 may store attributes including information related to:

- size of each content element (e.g., height and/or width in pixels, and/or visual size of content elements, when rendered on a computer screen);
- color scheme of each content element;
- presence of an object in each content element (e.g., determined via various computer vision techniques);
- element-type of each content element;
- resource of each content element (e.g. URL corresponding to the content element); and
- freshness parameter of each content element (e.g., a value that is inversely proportional to elapsed time since each content element has been crawled).

However, it should be noted that other or additional attributes associated with content elements are contemplated in other embodiments without departing from the scope of the present technology.

In addition to storing information associated with content elements, the database 260 may be configured to store indications of user interactions respectively associated with each content element and/or previously displayed interfaces. The user interactions associated with a content element that are stored in the database 260 may be previous user interactions that users of the search engine performed with respect to the content element as part of their interactions with the interface that included the content element. A non-exhaustive list of various user interactions that a user can execute in association with a content element is:

- a selection of the content element (e.g., a "click" on the content element);
- a long selection of the content element (e.g., a long "click" on the content element);
- the selection of the content element followed by a web resource transition (e.g., a click on the content element followed by a redirection to the resource corresponding to the content element);
- a hovering action over the content element (e.g., cursor hovering time over the content element); and/or
- interaction with a content element (e.g. playing audio or a video, zooming in on an image, interacting with a map, selecting a data for a weather content element, etc.).

However, it should be noted that indications of other user interactions may be stored in the database 260 in association with content elements in other embodiments without departing from the scope of the present technology. As described in further detail below, these attributes and/or interactions may be used to generate relevance scores for content elements and/or train an MLA to predict relevance scores for content elements. The attributes and/or interactions may be used to generate datasets that are used to train the MLA.

Some content elements stored in the database 260 are associated with less user interactions than others. In other words, some content elements that are stored in the database 260 are associated with limited user interactions. For example, some content elements may have previously been frequently presented to users and, therefore, are associated with a considerable amount of user interactions. Other content elements may be fresh content elements that are associated with a limited amount of user interactions since they have been "crawled" only recently and have been rarely presented to the users or not presented at all.

In some embodiments of the present technology, the server 230 implements a ranking system 250 for selecting content elements to be displayed to a user and ranking the content elements based on a predicted relevance to the user. Generally speaking, a ranking system 250 is configured to select content elements that are generally-relevant to a user and to gather indications of user interactions associated with these content elements for further ranking based on their relevancy to the user. In other words, the ranking system 250 may comprise a user-interaction-based ranking algorithm that is configured to rank content elements based on user interactions associated therewith.

The ranking system 250 may have been trained to rank content elements based on the user interactions associated therewith. For example, the ranking system 250 may be a machine learning algorithm (MLA) that has been trained to predict relevance scores of content elements indicating their relevancy to a user, based on, amongst other things, the previous user interactions associated with the content elements. The ranking system 250 may have been trained to learn relationships and/or data patterns in the previous user interactions that are indicative of the relevance of content elements to a user.

The user 211 may interact with the electronic device 210 which, in response to the user interaction with the electronic device 210, may execute a content discovery application. The electronic device 210 may generate a submission data packet 280 indicating that the user 211 has activated the content discovery application. The submission data packet 280 may comprise information indicative of the user, such as a user ID, and may be sent to the server 230 via the communication network 240. The submission data packet 280 may comprise a request for content elements to display to the user 211.

Upon receiving the submission data packet 280 by the server 230, the ranking system 250 may access the database 260 in order to retrieve content elements to display to the user 211. The ranking system 250 may determine the content elements to display to the user 211 based on various factors. For example if a content element has previously been displayed to the user 211, that content element might not be selected to be displayed to the user 211 again.

The ranking system 250 may generate a ranked set of content elements to be displayed to the user 211. An interface may then be generated based on the ranked set of elements. The interface may be generated by the server 230 and/or the electronic device 210. The interface and/or ranked set of content elements may be transmitted to the electronic device 210 via the response data packet 290. If the interface was not transmitted to the electronic device 210, the content discovery application executing on the electronic device 210 may generate the interface. The user 211 of the electronic device 210 may interact with the interface. The user interactions with the interface may be recorded and transmitted to the server 230. These interactions may be used to further train the ranking system 250.

Interface with Content Elements

Figure 3:
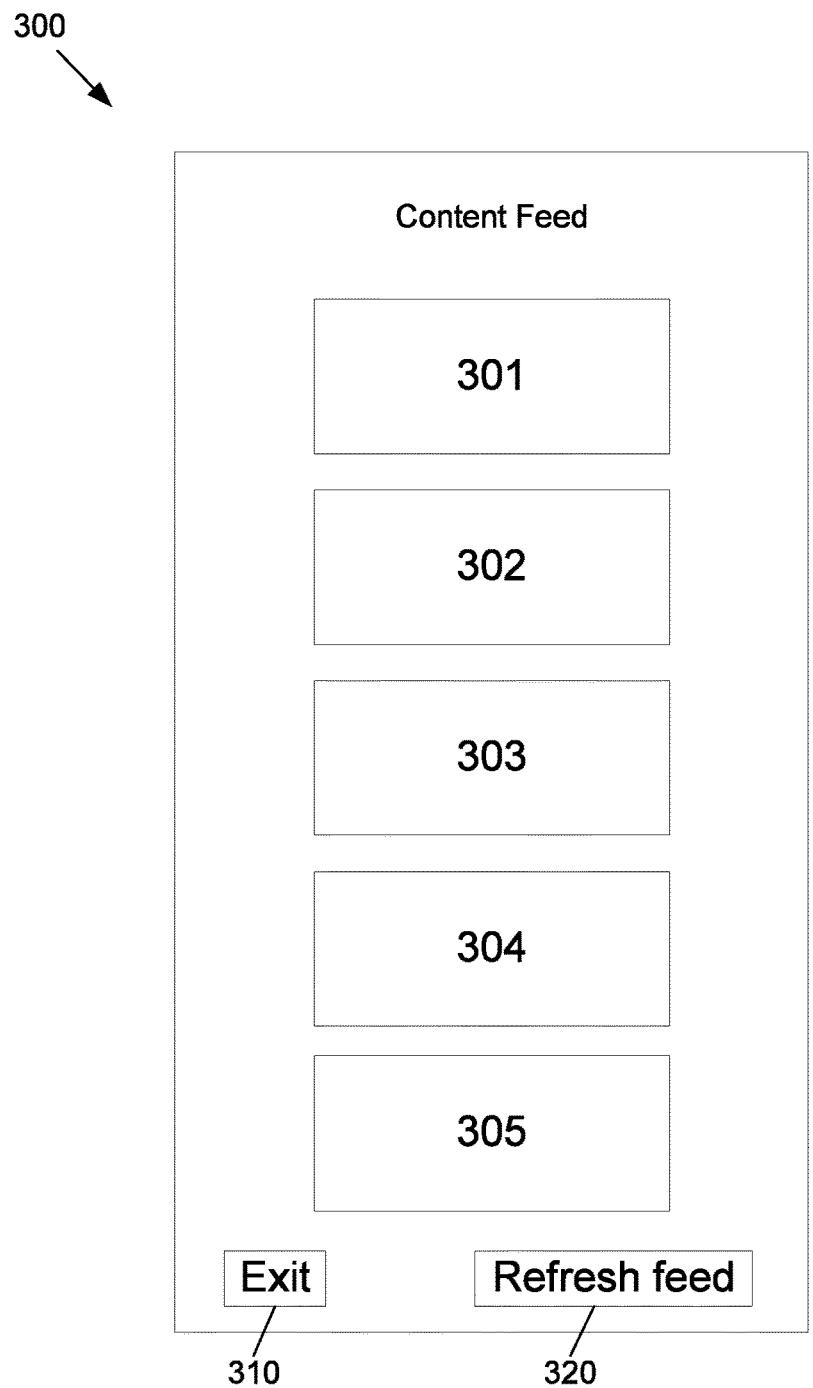
FIG. 3 depicts an interface with content elements according to some embodiments of the present technology.

With reference to FIG. 3, there is depicted an example of an interface 300 with content elements according to some embodiments of the present technology. The interface 300 may be displayed on a display of a computer system 100. For example, the interface 300 may be displayed on the electronic device 210 or the electronic device 212. The interface 300 may be generated by a user's personal computer system 100 or by a server, such as the server 230. The interface 300 may be displayed by an application, such as a mobile application, web browser, and/or any other application executing on a computer system 100.

The interface 300 may include a scrollable list of content elements. The interface 300 includes content elements 301, 302, 303, 304, and 305. The illustrated interface 300 is an example only and it should be understood that the interface 300 may include any number of content elements. In fact, the interface 300 may include an "endless" list of content elements, whereby as the user scrolls the interface 300, new suggested content elements are displayed. Although the content elements 301-05 are illustrated as tiles in a vertical arrangement in the interface 300, it should be understood that content elements may be displayed in any arrangement, such as a horizontal arrangement and/or a nested arrangement. The content elements may be displayed in a vertical feed having rows with multiple content elements. The content elements 301-05 may all be a same size, as illustrated, or may be different sizes.

The content elements 301-05 may be displayed in a ranked order determined based on a predicted relevance score assigned to each of the content elements 301-05. A relevance score indicating a predicted likelihood that the user will interact with a content element may be determined for each of the content elements 301-05. The content element 301 may be the top ranked element, and may have the highest predicted relevance score of the content elements 301-05. The content element 305 may be the lowest ranked element and may have the lowest predicted relevance score of the content elements 301-05. Additional content elements that are ranked lower than the content element 305 might not be displayed initially, but may be displayed when the user scrolls up on the interface 300.

The content elements 301-05 may be any type of content elements, such as audio, video, news articles, images, hyperlinks, and/or any other type of content. A user may interact with the content elements 301-05, such as by selecting one of the content elements 301-05. The content elements 301-05 may each provide different options for interactions. For example if the content element 301 is an audio content element, the content element 301 may allow the user to play the audio associated with the content element 301, fast forward or rewind the audio associated with the content element 301, select another audio track similar to the audio associated with the content element 301, etc. In another example, if the content element 302 is a news article content element, the user may be able to select the content element 302 and a new interface with the news article may be displayed. The interface 300 may allow the user to rate the content elements 301-05, such as by selecting a numerical rating or by indicating a binary rating (like or un-like).

As described above, the interface 300 may be scrollable and/or have multiple pages. To display additional content elements the user may scroll the interface up or down, select a button for a next page, and/or use any other method for requesting additional content elements to be displayed. The interface 300 may include selectable elements for exiting the interface 300, such as the 'Exit' button 310. When the user selects the 'Exit' button 310, the interface 300 may no longer be displayed. For example an application displaying the interface 300 may be closed. The interface 300 may include a button for refreshing the interface 300, such as the 'Refresh feed' button 320, which may cause new content elements to be displayed as replacements for the previously displayed content elements 301-05.

All of the user's interactions with the interface 300 may be recorded. The record may include which of the content elements 301-05 were selected or otherwise interacted with, an amount of time corresponding to each interaction, an order of the interactions, a record of each content element that was displayed on the interface 300, whether the user selected to exit the interface 300 such as by selecting the 'Exit' button 310, whether the user refreshed the interface such as by selecting the 'Refresh feed' button 320, how the user interacted with the content elements 301-05, and/or any other data regarding the user's interactions with the interface 300. The user interactions with the interface 300 may be stored in a dataset. The dataset may be used to train an MLA for predicting relevance scores indicating a likelihood that a user will interact with a content element.

Dataset of User Interactions

Figure 4:
FIG. 4 depicts content element scores according to some embodiments of the present technology.

FIG. 4 illustrates a dataset 400 of user interactions with the interface 300. The dataset 400 may be a training dataset used to train an MLA for predicting relevance scores for content elements. The user interactions in the dataset 400 are for illustrative purposes only, and it should be understood that user interactions may be stored in any suitable format. It should also be understood that the dataset 400 may contain additional information that is not illustrated in FIG. 4, such as attributes of the content elements.

The dataset 400 indicates that the content element 301 was an article content element that was selected first and viewed for 90 seconds. The content element 302 was a video content element that was selected second and played to the end of the video. The content element 303 was selected third and then the interface 300 was closed. The content elements 304 and 305 were not selected. The content element 303 was the last-viewed content element, as this was the last content element selected prior to the interface 300 being closed or refreshed by the user. The lowest-ranked content element that the user interacted with may be selected as the last-viewed content element, in which case the content element 303 would still be the last-viewed content element.

A win score and/or loss score may be determined for each of the content elements 301-05. A label may be assigned to each of the content elements 301-05 based on the win scores and/or loss scores. The labels may be used to train an MLA to predict relevance scores for the content elements 301-05. Any range and/or scale for the win scores, loss scores, and/or labels may be used. In the dataset 400, a higher win score and/or label indicates that a content element is more likely to be relevant to a user and/or more likely to be interacted with by a user. A higher loss score indicates that a content element is less likely to be relevant to a user and/or interacted with by a user. Various methods may be used for calculating the win scores, loss scores, and/or labels.

A win score may be assigned to content elements that the user interacted with. In the dataset 400, the content elements 301, 302, and 303 were interacted with and therefore were assigned win scores. A loss score may be calculated for content elements 304 and 305 that the user did not interact with and/or that were displayed after the last-viewed content element 303. A label for a content element may be determined based on the content element's win score and/or loss score. The label may be a sum of the content element's win score and loss score, maximum of the content element's win score and loss score, minimum of the content element's win score and loss score, mean of the content element's win score and loss, etc. Any other suitable method may be used for determining the label based on the win score and/or the loss score.

The content element 301 is assigned a win score of '1'. Each type of content element may have a different formula used to calculate the win score for a content element. For example for an article content element like the content element 301, the win score may be calculated based on whether the content element 301 was selected, an amount of time that the user spent viewing the article, whether the user reached the end of the article, and/or any other attribute. Similarly, the content element 302 is given a win score of '0.8'. A video-specific function may be used to determine the win score for the video content element 302. The content element 303 was assigned a win score of '0.7'. For content elements 301, 302, and 303 a loss score might not be calculated, or the loss score may be determined to be zero for those content elements. A loss score may be assigned to a content element when the content element was not selected but a lower-ranked content element was selected. For example, if the content element 301 had not been selected, but the content element 302 was selected, the content element 301 may be assigned a loss score.

Loss scores may be determined for the content elements 304 and 305, which were displayed below the last-viewed content element 303 and/or ranked lower than the last-viewed content element 303. The loss scores for the content elements 304 and 305 may be determined based on a distance between the content elements 304 and 305 and the last-viewed content element 303. The content element 304 was displayed adjacent to the content element 303, so the content element 304 may be assigned the highest loss-score. In this example, the content element 304 was assigned a loss score of '0.8.' The content element 305 was displayed further away from the content element 303, so the loss score of the content element 305 is lower than the loss score of the content element 304. The loss score for the content element 305 is '0.4'.

As described above, various methods may be used for assigning a label to a content element based on the content element's win score and/or loss score. For example, labels may be determined on a scale of zero to one, where zero indicates that the content element has a low relevance and one indicates that the content element is highly relevant. In this example, the content element 302 may be assigned a label of '0.7', the content element 304 may be assigned a label of '0.05', and the content element 305 may be assigned a label of '0.2'. But it should be understood that any other suitable formula may be used for determining the labels. As described in further detail below, an MLA may be trained using training datasets, such as the dataset 400, to predict a relevance score for a content element based on the labels in the training datasets. The training datasets used to train the MLA may include the labels but might not include the win scores and/or loss scores.

Method for Training an MLA (Non-Limiting Embodiment)

Figure 5:
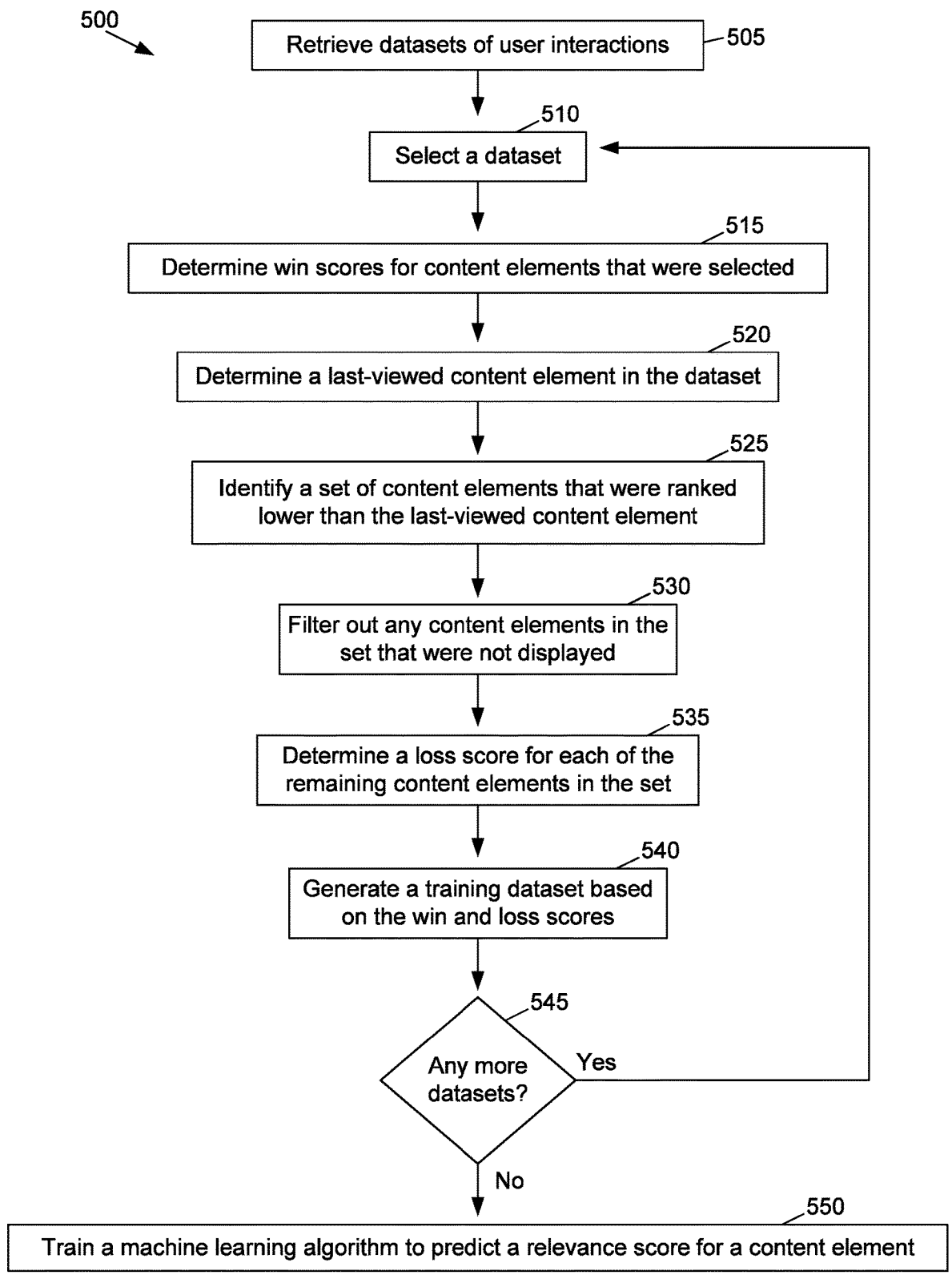
FIG. 5 is a flow diagram of a method for training a machine learning algorithm (MLA) to predict a relevance score for a content element according to some embodiments of the present technology.

FIG. 5 is a flow diagram of a method 500 for training an MLA to predict a relevance score for a content element according to some embodiments of the present technology. In one or more aspects, the method 500 or one or more steps thereof may be performed by a computing system, such as the computer system 100. The method 500 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order Step 505: Retrieve Datasets of User Interactions At step 505 datasets of user interactions may be retrieved, such as the dataset 400. Any number of datasets may be retrieved. Each dataset may indicate a user's interactions with an interface displaying content elements, such as the interface 300. For each content element in a dataset the dataset may contain various attributes of the content element, such as a type of the content element, a source of the content element, a ranking of the content element, an age of the content element, a length of the content element, a number of times the content element has been viewed, a user rating corresponding to the content element, and/or any other attributes of the content element. For each content element the dataset may include a record of a user's interactions with the content element and/or the user's interactions with an interface that included the content element.

The datasets may be retrieved from a database. Although described as individual datasets, the data may be stored and/or retrieved in any format. For example a single dataset may include information regarding multiple users. The datasets may be used as training data for training an MLA.

Step 510: Select a Dataset

At step 510 a dataset may be selected. The datasets may be selected in any order. For example the datasets may be selected based on the age of the data in the datasets. The datasets may be processed in parallel, in which case multiple datasets may be selected and the steps 515-40 may be performed simultaneously for multiple datasets.

Step 515: Determine Win Scores

At step 515 a win score may be determined for each content element in the dataset that the user interacted with. Different formulas for calculating win scores may be used for different types of content elements. If a content element was not interacted with, a win score might not be determined for that content element and/or the win score of the content element may be set to zero. If a user did interact with a content element, the formula corresponding to the type of the content element may be retrieved and a win score may be determined for the content element.

The formulas for determining win scores may be specific to the type of content element. For example a formula for video content elements may assign a win score of '0.5' if the user views fifteen seconds of video and assign a win score of '1.0' if the user views the video until the end of the video. In another example a formula for article content elements may assign a win score of '0.7' if the user spends more than thirty seconds reading the article. The formulas may be manually defined by human operators. The formulas may be adjusted over time.

Step 520: Determine a Last-Viewed Content Element in the Dataset

At step 520 a last-viewed content element for the dataset may be determined. The last-viewed content element may be the content element that was selected last prior to the interface being closed, refreshed, and/or otherwise navigated away from. The last-viewed content element may be determined based on the recorded user interactions stored in the dataset. The last-viewed content element may have been previously determined and an indicator corresponding to the last-viewed content element may be stored in the dataset.

The lowest-ranked content element that the user interacted with may be determined and used as the last-viewed content element. The lowest-ranked content element may be selected as the last-viewed content element regardless of whether it was actually the last content element that the user interacted with.

Step 525: Determine Content Elements Ranked Lower than the Last-Viewed Content Element At step 525 the content elements that were ranked lower than the last-viewed content element may be determined. Content elements that were displayed after the last-viewed content element may be identified. Each of the content elements in the dataset may be ranked. The rankings may have been determined based on predicted scores for the content elements and/or any other attributes of the content elements. All of the content elements that were ranked lower than the last-viewed content element may be identified and/or stored in a set. For example in FIG. 3, if the last-viewed content element is the content element 302, then the content elements 303, 304, and 305 may be identified at step 525. In some instances content elements that were ranked lower than the last-viewed content element may be identified at step 525 regardless of whether or not they were displayed to the user. In other instances, content elements that were not displayed might not be identified at step 525, in which case step 530 may be skipped.

Step 530: Filter Out any Content Elements in the Set that were not Displayed

At step 530 any content elements that were not displayed to the user may be identified and filtered out of the content elements determined at step 525. The dataset may indicate which content elements were displayed and/or which content elements were not displayed. For example the dataset may include an indicator of the lowest ranked content element that was displayed. In this example, any content elements that were ranked lower than the lowest ranked content element may be filtered out of the set of content elements identified at step 525.

Step 535: Determine a Loss Score for Each Content Element

At step 535 a loss score may be determined for each of the remaining content elements after the filtering at step 530. A loss score may be determined for each content element that was displayed and/or was ranked lower than the last-viewed content element. The loss score for a content element may be determined based on a difference between the ranking of the content element and the ranking of the last-viewed content element. Content elements having a higher difference between their ranking and the ranking of the last-viewed content element may be assigned lower loss scores. The loss score for a content element may be determined based on a displayed distance between the content element and the last-viewed content element.

Step 540: Generate a Training Dataset

At step 540 labels may be determined for the content elements based on the win scores and loss scores. The labels may be assigned to the content elements to generate a training dataset. As described above, various formulas may be used for determining a label for a content element based on the content element's win score and/or loss score. For example, the label may be calculated as the loss score subtracted from the win score. In this example, if a content element was assigned a win score but not a loss score, the label for the content element may be the win score, and similarly if a content element was assigned a loss score but not a win score, the relevance score for the content element may be the loss score subtracted from zero.

The training dataset may include all or a portion of the data in the dataset selected at step 510. The training dataset might not include content elements that were not assigned a win score, a loss score, and/or a label. The training dataset might not include the win scores and/or loss scores for content elements. The training dataset may include various attributes of each content element, such as a type of the content element, a source of the content element, a ranking of the content element, an age of the content element, a length of the content element, a number of times the content element has been viewed, a user rating corresponding to the content element, and/or any other attributes of the content element. The attributes may be referred to as 'features' used by the MLA for predicting relevance scores.

Step 545: Determine Whether there are More Datasets to Process

At step 545 a determination may be made as to whether there are any more datasets to process. If labels have been calculated for all of the datasets retrieved at step 505, the method 500 may proceed to step 550. Otherwise, if more datasets are available to be processed, the method 500 may proceed to step 510 and labels may be generated for the content elements in the remaining datasets.

Step 550: Train the MLA

At step 550 the MLA may be trained to predict a relevance score for a content element. The MLA may contain a neural network, clustering algorithm, decision tree, and/or any other type of MLA. The training datasets generated at step 540 may be used to train the MLA. Data points from the datasets may be input to the MLA to train the MLA. Each data point may correspond to a single content element. Each data point input to the MLA may include attributes of a content element and the label of the content element. For each data point input to the MLA the MLA may predict a relevance score for the content element of the data point. The predicted relevance score may then be compared to the label for the content element that was determined at step 540. A difference between the predicted relevance score and the label may be determined, and the MLA may be adjusted based on the difference.

In some instances, the MLA may be regularly re-trained using additional datasets, such as newly recorded data regarding user interactions with interfaces. By re-training the MLA with updated records of user interactions, the MLA may be updated to respond to changing user interests.

Method for Generating an Interface with Content Elements (Non-Limiting Embodiment)

Figure 6:
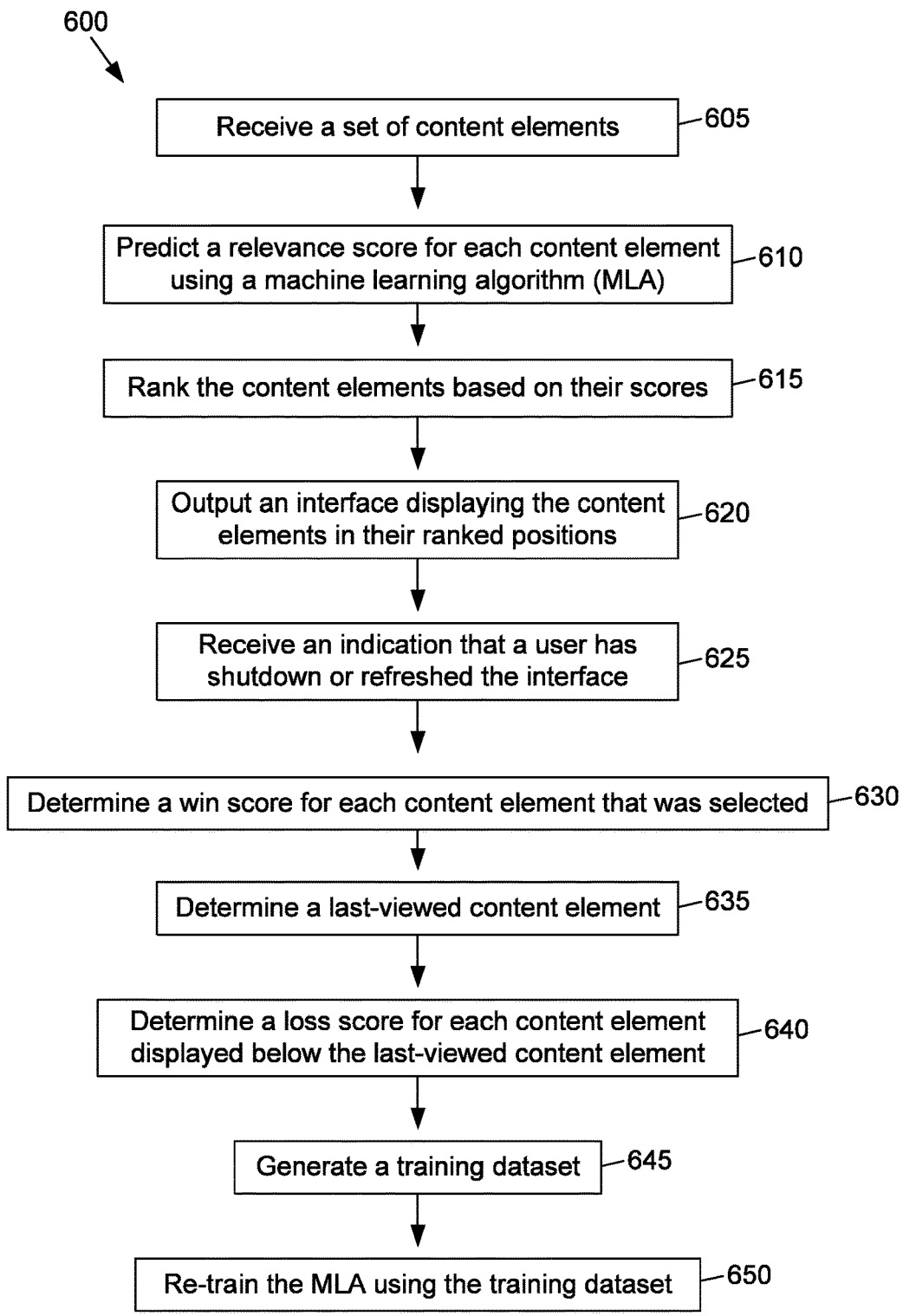
FIG. 6 is a flow diagram of a method for generating an interface with content elements according to some embodiments of the present technology.

FIG. 6 is a flow diagram of a method 600 for generating an interface with content elements according to some embodiments of the present technology. In one or more aspects, the method 600 or one or more steps thereof may be performed by a computing system, such as the computer system 100. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order Step 605: Receive a Set of Content Elements At step 605 a set of content elements may be received. Any number and/or type of content elements may be received. Attributes of each content element may be received and/or determined. The attributes of a content element may include an age of the content element, source of the content element, user rating of the content element, type of the content element, length of the content element, number of times the content element has been viewed, and/or any other attribute of the content element.

Step 610: Predict a Relevance Score for Each Content Element

At step 610 a relevance score may be predicted for each of the content elements received at step 605. The relevance score may indicate a predicted likelihood that a user will select and/or interact with a content element. The relevance score may be predicted using an MLA, such as the MLA generated using the method 500.

Step 615: Rank the Content Elements

At step 615 the content elements may be ranked. The content elements may be ranked based on the relevance scores generated at step 610. Content elements having a higher relevance score, and thereby having a higher predicted likelihood that a user will interact with them, may be ranked higher. A ranked list of content elements may be output. Some content elements may be filtered out and/or not included in the ranked list. The ranked list may have a parameter indicating a maximum number of content elements to include in the ranked list and/or content elements having a relevance score that is lower than a threshold score may be filtered out.

Step 620: Output an Interface with the Content Elements

At step 620 an interface with the content elements may be output, such as the interface 300. The interface may display the content elements in their ranked order. The interface may be a scrollable interface in which highest-ranked content elements are displayed at the top of the interface. As the user scrolls through the interface, additional content elements may be displayed. Any user interactions with the interface may be recorded. The interface may be output by a content discovery application.

Step 625: Receive an Indication that the Interface was Closed

At step 625 an indication may be received that the interface was closed and/or refreshed. When the interface is refreshed, the steps 605-20 may be repeated, and a new set of content elements may be displayed. The indication may be that the user closed a mobile application displaying the interface, closed a web browser displaying the interface, navigated to another web page, and/or any other indication that the interface was closed.

In order to further refine the MLA and/or have the MLA react to changing user interests, the MLA may be updated based on user interactions with interfaces. Labels for each content element may be determined based on the user interactions and then compared to the predicted relevance scores. The MLA may be updated based on the differences between the predicted relevance scores and the labels.

Step 630: Determine Win Scores for the Content Elements

At step 630 a win score may be determined for each of the content elements that was selected by the user. Actions performed at step 630 may be similar to those described at step 515 of the method 500. For each content element, a formula corresponding to the type of that content element may be used to determine the win score for the content element. Win scores may be determined for some or all of the content elements that the user interacted with. If a win score was not determined for a content element, such as if the user did not interact with the content element, the win score for that content element may be set to zero.

Step 635: Determine a Last-Viewed Content Element

At step 635 a last-viewed content element may be determined. The last-viewed content element may be the last content element that the user interacted with in the interface displayed at step 620 and/or the lowest-ranked content element that the user interacted with in the interface. Actions performed at step 635 may be similar to those performed at step 520 of the method 500.

Step 640: Determine Loss Scores

At step 640 loss scores for the content elements may be determined. Loss scores may be determined for each of the content elements ranked lower and/or displayed after the last-viewed content element. Actions performed at step 640 may be similar to those performed at steps 525-35 of the method 500.

Step 645: Generate a Training Dataset

At step 645 labels may be determined for the content elements based on their win and/or loss scores. A training dataset may be generated where each data point in the dataset includes attributes of a content element and a label assigned to the content element. A label may be determined for all or a subset of the content elements received at step 605. The training dataset may include the predicted relevance score for each content element. Actions performed at step 645 may be similar to those performed at step 540 of the method 500.

Step 650: Re-Train the MLA

At step 650 the MLA may be re-trained based on the training dataset generated at step 645. The MLA may compare the predicted relevance score to the label The MLA may be re-trained periodically, such as when a threshold number of datasets have been collected. The MLA may be configured to give a higher weight to newer data, so that the MLA is reactive to changing user interests.

It should be apparent to those skilled in the art that at least some embodiments of the present technology aim to expand a range of technical solutions for addressing a particular technical problem, namely determining rank positions of elements by a ranking system.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining rank positions, by a ranking system, of a set of content elements, the method executable by a server, the method comprising:

during a training phase of the ranking system, acquiring a plurality of datasets, each dataset comprising an indication of previous user interactions associated with an interface displaying a ranked list of content elements, and for each dataset of the plurality of datasets:
determining a last-viewed content element in the ranked list of content elements of the dataset, wherein the last-viewed content element was a last content element interacted with by a user prior to the interface associated with the dataset being abandoned;
determining, by the server, a win score for at least one content element that the user selected from the ranked list of content elements of the dataset;
determining a loss score for at least one content element ranked lower than the last-viewed content element; and
training, by the server, the ranking system to predict a relevance score for content elements based on win scores and loss scores for the content elements of the ranked list of content elements; and during an in-use phase of the ranking system, the ranking system having been trained to rank content elements based on previous user interactions:
receiving, by the server, the set of content elements;
predicting, by the ranking system, a predicted relevance score for each content element of the set of content elements; and
determining, based on the predicted relevance score of each content element of the set of content elements, the rank positions of each content element of the set of content elements.

2. The method of claim 1, wherein determining the loss score for the at least one content element ranked lower than the last-viewed content element comprises:
determining, for a content element ranked lower than the last-viewed content element, a number of content elements displayed between the content element and the last-viewed content element; and
determining, based on the number of content elements, the loss score for the content element.

3. The method of claim 1, wherein determining the loss score for the at least one content element ranked lower than the last-viewed content element comprises:
determining, for a first content element ranked lower than the last-viewed content element, a first number of content elements displayed between the first content element and the last-viewed content element;
determining, for a second content element ranked lower than the last-viewed content element, a second number of content elements displayed between the second content element and the last-viewed content element;
determining, based on the first number of content elements, a first loss score for the first content element; and
determining, based on the second number of content elements, a second loss score for the second content element, wherein the second loss score is greater than the first loss score, and wherein the second number of content elements is lower than the first number of content elements.

4. The method of claim 1, further comprising displaying a vertically arranged set of tiles, each tile comprising a content element of the set of content elements.

5. The method of claim 4, wherein the vertically arranged set of tiles are displayed in the order of the rank positions.

6. The method of claim 1, wherein for each dataset, each content element in the ranked list of content elements of the dataset was displayed to the user.

7. The method of claim 1, further comprising, for each dataset, removing any content elements in the ranked list of content elements of the dataset that were not displayed to the user.

8. The method of claim 1, wherein determining the rank positions of each content element comprises ranking the set of content elements in order from highest-scoring content element to lowest-scoring content element.

9. A system comprising:
at least one processor, and
memory storing a plurality of executable instructions which, when executed by the at least one processor, cause the system to:
during a training phase of a ranking system, acquire a plurality of datasets, each dataset comprising an indication of previous user interactions associated with an interface displaying a ranked list of content elements, and for each dataset of the plurality of datasets:
  determine a last-viewed content element in the ranked list of content elements of the dataset, wherein the last-viewed content element was a last content element selected by a user prior to the interface associated with the dataset being abandoned;
  determine a win score for at least one content element that the user selected from the ranked list of content elements of the dataset;
  determine a loss score for at least one content element ranked lower than the last-viewed content element; and
  train the ranking system to predict a relevance score for content elements based on win scores and loss scores for the content elements of the ranked list of content elements; and
during an in-use phase of the ranking system, the ranking system having been trained to rank content elements based on previous user interactions:
  receive a set of content elements;
  predict, by the ranking system, a predicted relevance score for each content element of the set of content elements; and
  determine, based on the predicted relevance score of each content element of the set of content elements, rank positions of each content element of the set of content elements.

10. The system of claim 9, wherein the instructions that cause the system to determine the loss score for the at least one content element comprise instructions that cause the system to:
determine, for a content element ranked lower than the last-viewed content element, a number of content elements displayed between the content element and the last-viewed content element; and
determine, based on the number of content elements, the loss score for the content element.

11. The system of claim 9, wherein the instructions that cause the system to determine the loss score for the at least one content element comprise instructions that cause the system to:
determine, for a first content element ranked lower than the last-viewed content element, a first number of content elements displayed between the first content element and the last-viewed content element;
determine, for a second content element ranked lower than the last-viewed content element, a second number of content elements displayed between the second content element and the last-viewed content element;
determine, based on the first number of content elements, a first loss score for the first content element; and
determine, based on the second number of content elements, a second loss score for the second content element, wherein the second loss score is greater than the first loss score, and wherein the second number of content elements is lower than the first number of content elements.

12. The system of claim 9, wherein the instructions cause the system to:
display, in an order of the rank positions, a vertically arranged set of tiles, each tile comprising a content element of the set of content elements.

13. The system of claim 9, wherein for each dataset, each content element in the ranked list of content elements of the dataset was displayed to the user.

14. The system of claim 9, wherein the instructions cause the system to, for each dataset, remove any content elements in the ranked list of content elements of the dataset that were not displayed to the user.

15. The system of claim 9, wherein the instructions that cause the system to determine the rank positions of each content element comprise instructions that cause the system to rank the set of content elements in order from highest-scoring content element to lowest-scoring content element.

16. A non-transitory computer-readable medium comprising computer-readable instructions that, upon being executed by a system, cause the system to:
acquire a plurality of datasets, each dataset comprising an indication of previous user interactions associated with an interface displaying a ranked list of content elements, and for each dataset of the plurality of datasets:
  determine a last-viewed content element in the ranked list of content elements of the dataset, wherein the last-viewed content element was a last content element selected by a user prior to the interface associated with the dataset being abandoned,
  determine a win score for at least one content element that the user selected from the ranked list of content elements of the dataset,
  determine a loss score for at least one content element ranked lower than the last-viewed content element, and
  train a ranking system to predict a relevance score for content elements based on win scores and loss scores for the content elements of the ranked list of content elements;
receive a set of content elements;
predict, by the ranking system, a predicted relevance score for each content element of the set of content elements; and
determine, based on the predicted relevance score of each content element of the set of content elements, rank positions of each content element of the set of content elements.

17. The non-transitory computer-readable medium of claim 16, wherein the instructions that cause the system to determine the loss score for the at least one content element comprise instructions that cause the system to:
determine, for a content element ranked lower than the last-viewed content element, a number of content elements displayed between the content element and the last-viewed content element; and
determine, based on the number of content elements, the loss score for the content element.

18. The non-transitory computer-readable medium of claim 16, wherein the instructions that cause the system to determine the loss score for the at least one content element comprise instructions that cause the system to:
determine, for a first content element ranked lower than the last-viewed content element, a first number of content elements displayed between the first content element and the last-viewed content element;
determine, for a second content element ranked lower than the last-viewed content element, a second number of content elements displayed between the second content element and the last-viewed content element;

determine, based on the first number of content elements, a first loss score for the first content element; and determine, based on the second number of content elements, a second loss score for the second content element, wherein the second loss score is greater than the first loss score, and wherein the second number of content elements is lower than the first number of content elements.

19. The non-transitory computer-readable medium of claim 16, wherein the instructions further cause the system to display, in an order of the rank positions, a vertically arranged set of tiles, each tile comprising a content element of the set of content elements.

20. The non-transitory computer-readable medium of claim 16, wherein the instructions cause the system to, for each dataset, remove any content elements in the ranked list of content elements of the dataset that were not displayed to the user.

* * * * *